US007612988B2

(12) United States Patent
Ulinskas

(10) Patent No.: US 7,612,988 B2
(45) Date of Patent: Nov. 3, 2009

(54) SWITCHGEAR WITH MOVABLE USER INTERFACE MODULE

(75) Inventor: Algerd M. Ulinskas, Torrington, CT (US)

(73) Assignee: Satin America Corporation, Shelton, CT (US)

( * ) Notice: Subject to any disclaimer, the term of this patent is extended or adjusted under 35 U.S.C. 154(b) by 167 days.

(21) Appl. No.: 11/784,390

(22) Filed: Apr. 5, 2007

(65) Prior Publication Data

US 2008/0247123 A1 Oct. 9, 2008

(51) Int. Cl.
*H02B 1/26* (2006.01)
*H02B 1/36* (2006.01)
*G01F 1/00* (2006.01)

(52) U.S. Cl. ........................................ 361/614; 361/605

(58) Field of Classification Search ................. 361/605, 361/614

See application file for complete search history.

(56) References Cited

U.S. PATENT DOCUMENTS 3,716,684 A * 2/1973 McMillen et al. ........ 200/50.21
4,249,227 A 2/1981 Kato et al.
4,279,397 A 7/1981 Larsson
4,390,926 A 6/1983 Hart
4,731,501 A 3/1988 Clark et al.
4,964,018 A 10/1990 Mallory et al.
5,148,353 A 9/1992 Morgan et al.
5,215,480 A * 6/1993 Lesslie et al. ............... 439/709
5,477,017 A * 12/1995 Swindler et al. ......... 200/50.24
5,949,640 A 9/1999 Cameron et al.
6,467,640 B1 10/2002 Hung
6,697,240 B2 * 2/2004 Nelson et al. ................. 361/64
6,744,363 B1 6/2004 Nicolai et al.
6,777,627 B1 8/2004 Stevenson
6,951,990 B1 * 10/2005 Miller ..................... 200/50.21
D541,798 S * 5/2007 Ichida et al. ............... D14/371
D559,792 S * 1/2008 Gemme et al. ............. D13/164
2002/0064010 A1 * 5/2002 Nelson et al. ................. 361/64
2004/0131361 A1 7/2004 Bischoff (Continued)

FOREIGN PATENT DOCUMENTS

WO WO 9324942 A1 * 12/1993
WO WO 2008046743 A2 * 4/2008

OTHER PUBLICATIONS

ABB Power Technologies S.p.A., REF542plus—ProtectIT Multifunction Protection and control Unit, 1VCP000059 en-Leaflet—Jan. 2004.*

(Continued)

*Primary Examiner*—Anatoly Vortman
(74) *Attorney, Agent, or Firm*—Peter L. Costas; Pepe & Hazard LLP

(57) ABSTRACT

A switchgear installation has a cubicle with a door to provide access thereinto, and a low voltage circuit breaker is mounted therein and accessible through the door. Coupled to the circuit breaker is a logic module, and a portable user interface module is releasably mounted on the exterior of the cubicle and operatively connected to the logic module to display information concerning the operation of the breaker and to provide an interface for the user to interact with the logic module and thereby with the breaker. The user interface module includes a battery providing the required power for setting and monitoring the functions of the breaker.

6 Claims, 10 Drawing Sheets

U.S. PATENT DOCUMENTS

2005/0168891 A1* 8/2005 Nilman-Johansson et al. . 361/23
2006/0129281 A1* 6/2006 Cargnelli et al. ............ 700/292
2006/0129336 A1* 6/2006 Pretlove et al. ............... 702/45
2007/0019369 A1* 1/2007 Merkel et al. ............... 361/605
2007/0052298 A1* 3/2007 Merkel et al. ............... 307/112
2007/0252599 A1* 11/2007 Zhou et al. .................. 324/424

OTHER PUBLICATIONS

ABB Power Technologies, REF542plus Manual Part 3, Installation and Commisioning, p. 1-33, Oct. 4, 2001.*
Pro-Display Instruction Manual URC/Utility Relay Company.

* cited by examiner

SWITCHGEAR WITH MOVABLE USER INTERFACE MODULE

The present invention relates to switchgear installations utilizing low voltage power circuit breakers.

Low voltage circuit breaker and insulated case circuit breakers 635_vac and below, are utilized to open and close electrical circuits in every power plant and nearly every factory in the world. In prior instances, operating personnel assigned to make adjustments, to set parameters, perform queries and monitor information, deal with battery functions available on solid state trip devices of low voltage circuit breakers, were exposed to potentially high levels of arc flash energy during the process.

More particularly, the operator has been exposed to high levels of arc flash energy because the module or modules controlling setup, monitoring, battery and querying functions were mounted on the circuit breaker itself and it was behind the protective front door of the circuit breaker cubicle.

Prior to the invention of solid state tripping systems, low voltage air circuit breakers were protected by circuit breaker mounted, in-line electro-mechanical tripping devices mounted in the lower front portion of the circuit breakers. When mounted in the electrical system, these electro-mechanical tripping devices could only be accessed by opening the front door of the circuit breaker cubicle, thus exposing the operator to the potential of an arc-flash incident. These early devices allowed for mechanical setting and viewing only of the settings.

In a few instances, these low voltage air circuit breakers were supplied with current sensors which were connected to the circuit breaker and connected through a set of secondary connectors to three large electro-mechanical relays mounted to a large door of an auxiliary cubicle in the lineup of switchgear which contained the circuit breakers. Any monitoring of current was performed by an additional set of current transformers mounted in the switchgear, wired to either three ammeters or one ammeter and one ammeter selector switch. This system was large, expensive and cumbersome.

Solid state tripping devices were first invented in the 1970's. The initial devices were complex, circuit breaker mounted, and provided no monitoring capabilities. Later successive designs of solid state tripping devices became less physically complex, utilized rms current values and peak current readings, changed from analog to digital operation, and added monitoring and querying capabilities.

In all cases, designs were produced which required the functions of setup, querying, battery function and monitoring to be handled by a module or modules which were mounted on the low voltage circuit breaker. When more than one module was utilized for setup, querying, monitoring and battery functions, the modules were physically separate and individually bolted to the frame of the low voltage circuit breaker.

In the past, setup, monitoring and querying of information external to the low voltage circuit breaker, have been attempted with varying levels of success, such as, for example, the expansive General Electric Epic System. In no prior instance has the task been simply and economically performed through the use of a single, convertible component module that is part of the solid state tripping system.

Redundant monitoring devices that replicate the setup, monitoring or querying functions of the solid state trip devices have been added to the outside of the circuit breaker cubicle door as exemplified by the Utility Relay Company PRO DISPLAY. This is, as stated, redundant and is costly. With this process, the operator still has the option to setup, monitor, query or deal with battery function on the inside of the circuit breaker cubicle, thus exposing himself to a potential arc flash hazard.

At the present time, devices such as ammeters and ammeter switches, that have nothing to do with solid state tripping devices have, for monitoring purposes, been mounted to the outside of the breaker cubicle door. In this instance, the module or modules containing the setup, monitoring, battery and querying functions of the solid state-tripping device are mounted to the frame of the breaker. Once again, the operator is exposed to arc flash hazards while dealing with the setup, monitoring, battery and querying functions Large controllers which, because of their size, are unable to be mounted on all low voltage circuit breaker cubicle doors have been provided in external cabinets. While these devices may provide levels of setup, query or monitoring functions for low voltage circuit breakers, they have always been redundant to the complete solid state trip devices that were mounted on the circuit breakers. These controllers represent a great expense beyond and above the cost of a solid state tripping device and still allow the operator to be exposed to the potential of an arc flash hazard if entry to the cubicle is required.

All digital solid state tripping systems require batteries, or external power sources, to provide for setup, querying and monitoring if the circuit breaker does not have a nominal 10% of its rated current flowing through it. In prior cases, the battery was mounted in a module which was mounted inside the front door of the circuit breaker cubicle, thus potentially exposing an operator who wanted to deal with the battery functions, to the potential of arc flash energy.

According to the National Fire Protection Association in NFPA-70E, the level of arc flash hazard to which the operator is exposed when performing the duties stated above while utilizing any solid state trip device that is mounted on the circuit breaker itself, can be between Level 1 and Level 4. Because of the potential of arc flash, the operator is required to wear protective clothing and gloves and a protective face shield. The operator, at a minimum, is required to wear cotton underwear, fire rated clothing or bib overalls, hard hat with safety glasses, fire rated gloves and EH rated shoes. At a maximum, the operator will have to wear a fire rated flash suit with double insulated hood and colored face shield and hard hat, safety glasses, hearing protection, voltage rated gloves and EH rated shoes. Not only is the operator in the now hazardous approach zone, but also the operator is faced with having to perform the required functions with less dexterity because of the gloves, and with impaired vision because of the tinted face shield.

All new AC low voltage air circuit breakers and insulated case circuit breakers are provided with overload protection by the circuit breaker mounted solid state tripping systems. Older low voltage air circuit breaker and insulated case circuit breakers can have their electromechanical overloads removed and replaced. Retrofitting these breakers with the new solid state tripping system of the present invention will result in a much safer working environment since the operator will no longer have to enter the cubicle since a user interface module will be able to be remote from the circuit breaker mounted logic module and the new module may be secured in position on each cubicle door or may be totally remote. It should be noted that all existing, new low voltage circuit breakers can also benefit from having their existing solid state tripping systems retrofitted with the modules proposed in this application.

Because of the design of the present invention, once the parameters of the logic modules have been properly set by the user interface module, the interface module may be totally removed from its electrical and mechanical connection to the logic module. Once this has been done, the circuit breaker will continue to function properly from a protective tripping standpoint.

It is an object of the present invention to provide a novel switchgear installation in which the operator can perform the set up, querying, and monitoring functions while safely outside of the cubicle.

It is also an object to provide such an installation in which the operator temporarily mounts upon the door a user interface module which is connected to the logic module on the breaker.

Another object is to provide such an installation in which a single user interface module may be used to perform the necessary operator functions for a multiplicity of circuit breakers, thus reducing the cost of installing and maintaining the installation.

A further object is to provide such an installation wherein redundant modules are avoided and thereby less costly.

SUMMARY OF THE INVENTION

It has now been found that the foregoing and related objects and advantages can be attained in a switchgear installation comprising a cubicle having a door to provide access thereinto and with a low voltage circuit breaker mounted therein and accessible through the door. A logic module is coupled to the circuit breaker and operatively connected to various components of the breaker to enable adjustment and reporting of its operation. A portable user interface module is releasably mounted on the exterior of the door and operatively connected to the logic module when so mounted. The interface module displays information concerning the operation of the breaker and provides an interface for the user to interact with the logic module and thereby with the breaker.

The portable user interface module includes a battery for providing the necessary power for operation of the logic module and the portable user interface module. The door provides a mounting into which the portable user interface module may be readily inserted or removed therefrom. At least one cable extends from the logic module to the portable user interface module. The cable desirably extends to the mounting on the door and the mounting includes a connector to which the user interface module may be coupled desirably.

For setup of the breaker, the portable user interface module may be nested with the logic module and is readily removable therefrom. The portable user interface module enables setting up, monitoring, querying functions for the breaker.

In most switchgear installations, there are multiple cubicles, breakers and logic modules, and the user interface module is mountable on the doors of each of the cubicles to interface with the logic module and breaker in each of the cubicles.

DETAILED DESCRIPTION OF ILLUSTRATED EMBODIMENT

As discussed previously, the present invention separates the circuitry and components required for monitoring and controlling the operation of the circuit breaker into two modules with the logic module being mounted upon the breaker and the mounting, querying and setting up functions being provided in a movable user interface module which can be utilized while outside the cubicle housing the breaker. The user interface module contains a battery to provide the power needed for operation of both modules. Only one user interface module is required for a switchgear installation since the user interface module can be removed quickly and easily from the mounting bracket or docking station on the door of one cubicle to the docking stations of other cubicles.

The attached drawings illustrate a preferred construction, but modifications may be made to deal with unique configurations and requirements.

Figure 1:
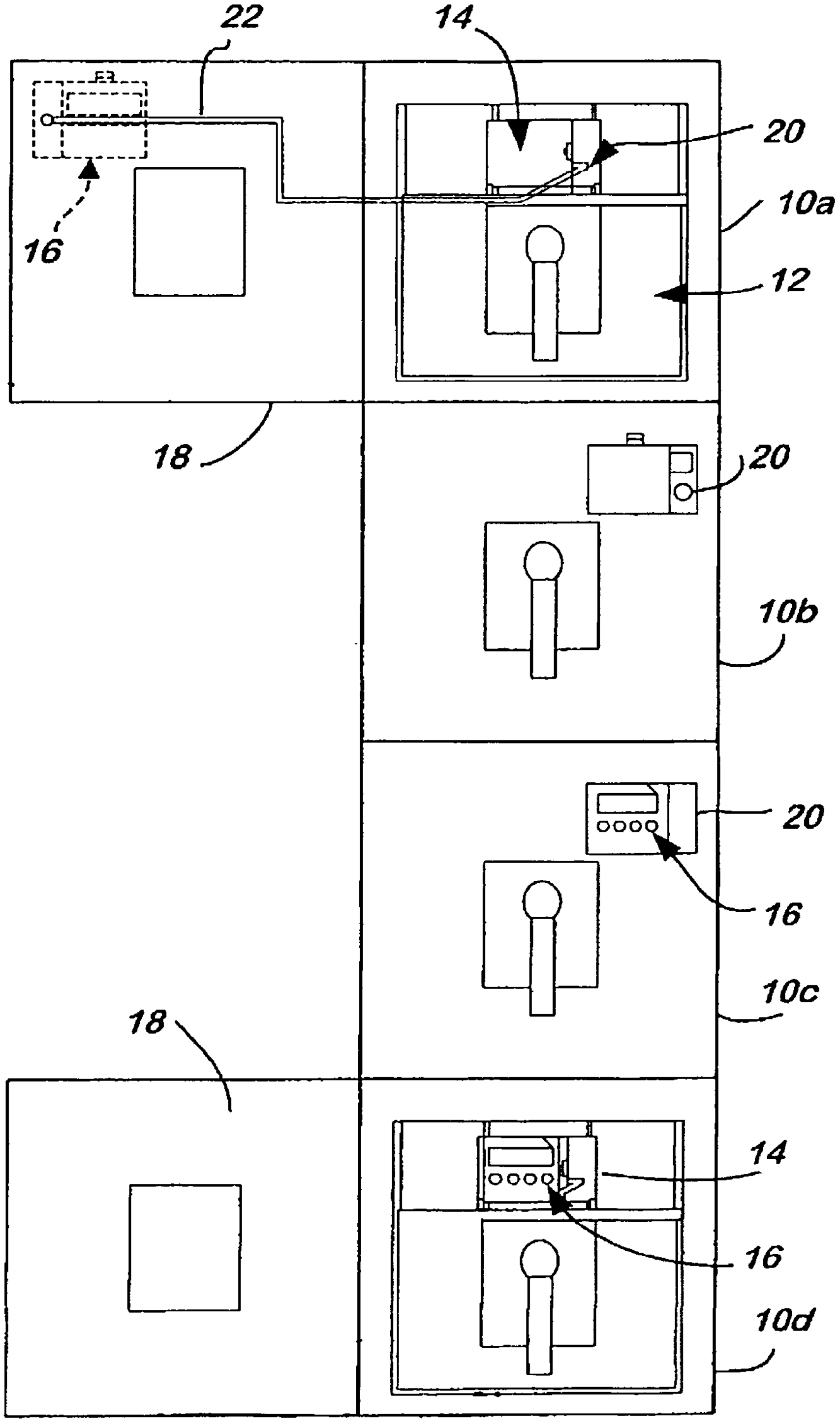
FIG. 1 is a front elevational view of a switchgear installation employing four cubicles and with the breakers therein shown in full line.

Turning first to FIG. 1, therein illustrated is a switchgear installation including four vertically stacked cubicles 10*a*, 10*b*, 10*c* and 10*d* which provide enclosures for the diagrammatically illustrated low voltage air circuit breakers 12 seated therein. In the cubicle 10*a*, the door 18 is open showing the logic module 14 seated on the breaker 12 and a user interface module 16 shown in phantom line as mounted on the door 18 with a cable 22 extending therebetween. The cubicle 10*b* shows a bracket 20 on the door 18 in which the user interface module 16 may be seated as shown in the cubicle 10*c*. The cubicle 10*d* shows the user interface module 16 nested into the logic module 14 which is mounted upon the breaker 12. As installed, the cabling 22 is routed from the logic module 14 to the user interface module 16. The logic module 14 has extended flanges, retention pins 38 and a spring loaded plunger 24 and connector for the user interface module 16 when it is nested into the logic module 14.

As will be readily appreciated, the movable user interface module 16 may be easily moved from the bracket 20 of a docking station on one door to the docking station 20 on the door of another cubicle. Desirably the docking station 20 includes a connector into which a connector on the movable interface module may be inserted when seated in the bracket 20.

Figure 2:
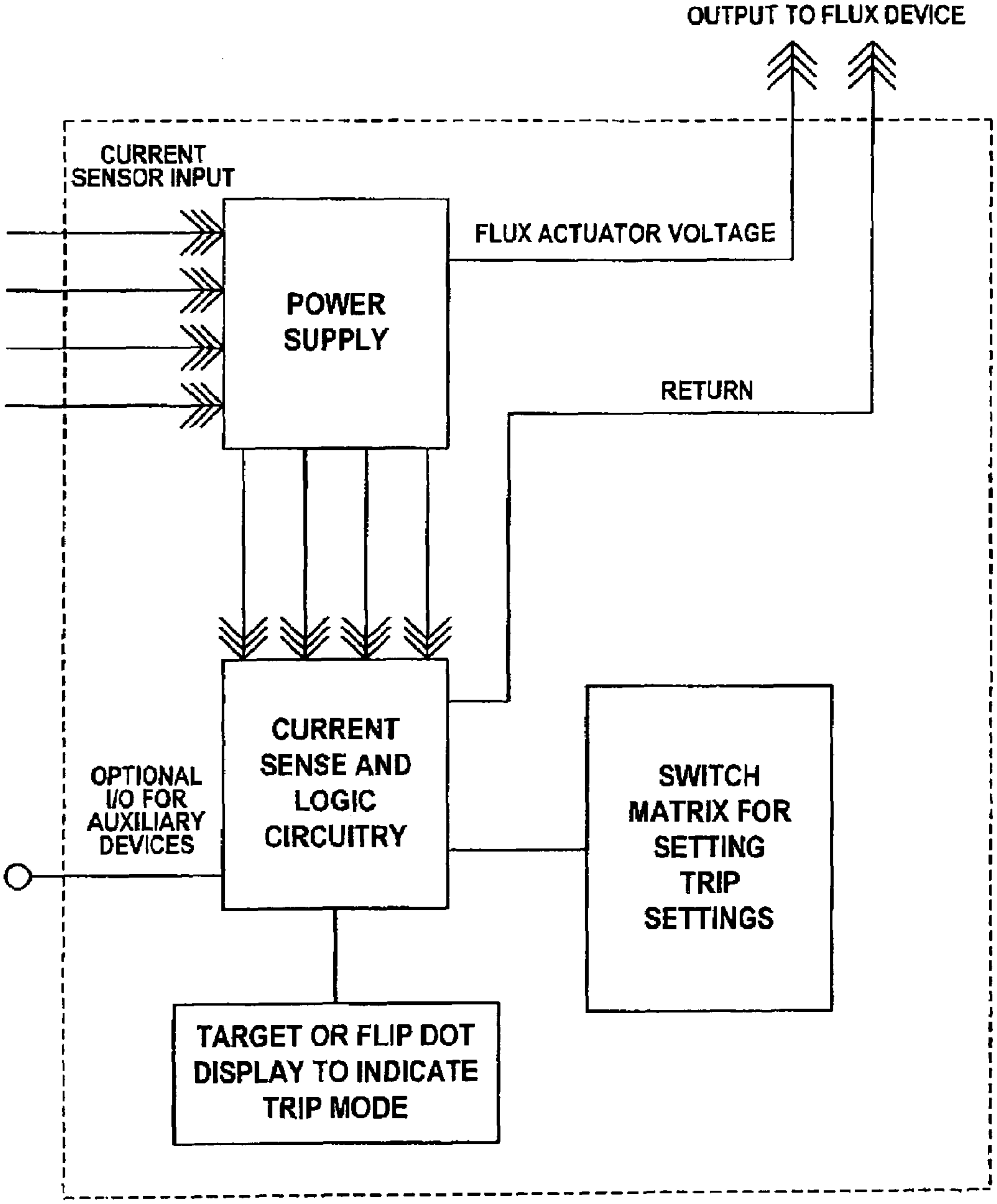
FIG. 2 (PRIOR ART)
FIG. 2 is a block diagram of a traditional analog trip unit.

FIG. 2 is a block diagram of the components of a conventional analog trip unit which are housed in a single enclosure and mounted on the circuit breaker frame. In the present invention, the functions are divided into logic module and movable user interface modules which will be described in detail hereinafter.

Figure 3:
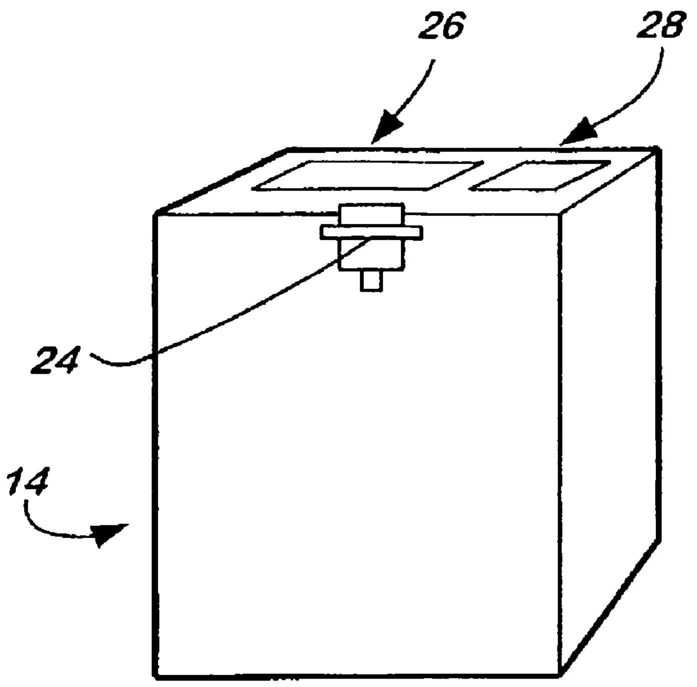
FIG. 3 is a perspective view of the logic module.

FIG. 3 is a perspective view of the logic module 14 showing a spring loaded plunger 24 for securing the user interface module 16 when it is nested with the logic module 14. A port 28 is provided in the logic module 14 for a connector such as an RJ45 connector on a cable (not shown) to connect it to the user interface module 16. There is also an auxiliary port 26 to provide connections to computers, bell alarm and other electronic functions.

Figure 4:
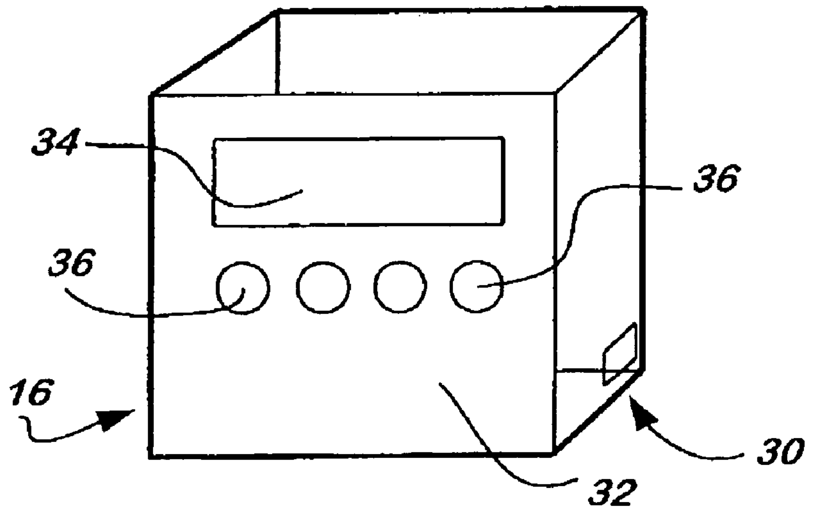
FIG. 4 is a perspective view of the user interface module.

FIG. 4 is a perspective view of the user interface module 16 showing a port 30 for a connector (typically an RJ45) for connection to the logic module by a cable (not shown). The face 32 has an LCD display 34 and buttons 36.

Figure 5:
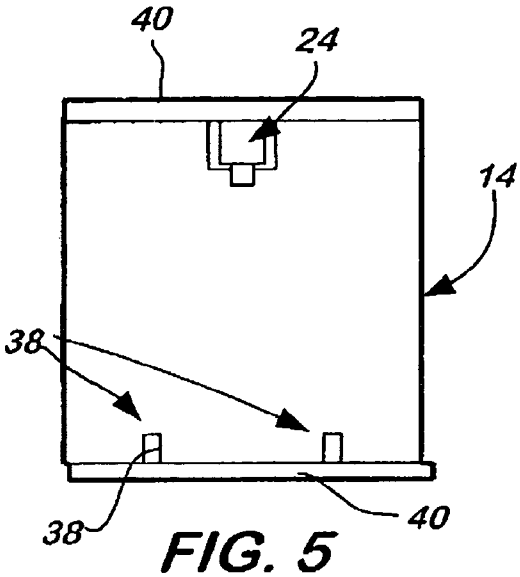
FIG. 5 is an elevational view of the logic module.

FIG. 5 is a front view of the logic module 14 showing retention pins 38 and the spring loaded plunger mechanism 24. Top and bottom flanges 40 will seat the user interface module 16 therebetween.

Figure 6:
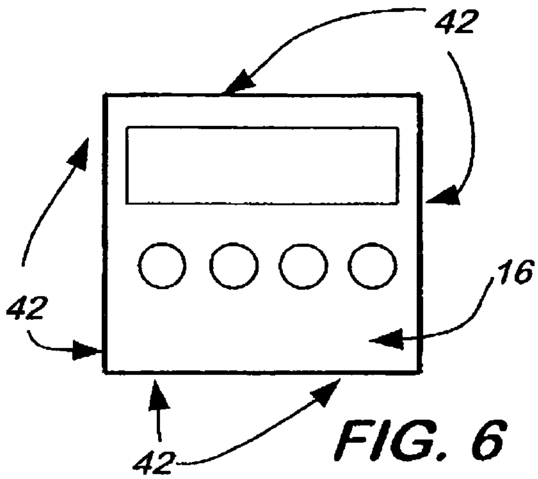
FIG. 6 is a front elevational view of the user interface module.
Figure 7:
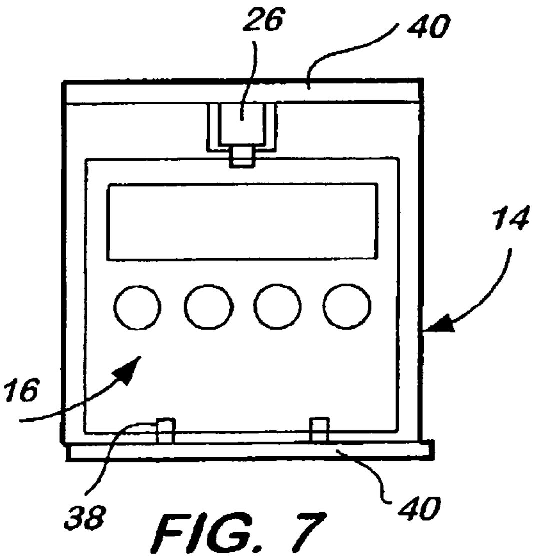
FIG. 7 is a diagrammatic illustration of the user interface module nested into the logic module.
Figure 8:
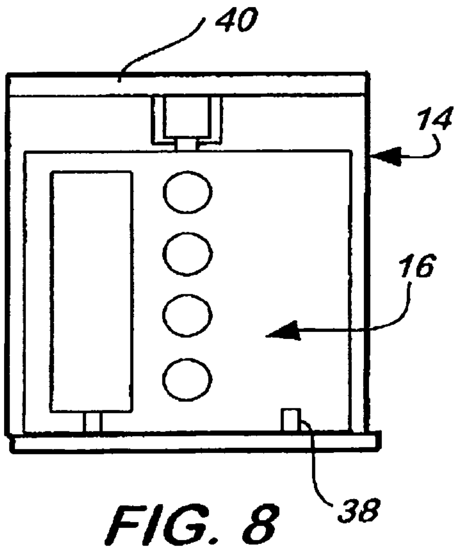
FIG. 8 is a similar view, but with the user interface module rotated 90°.

FIG. 6 is a front view of the user interface module 16 showing the location of holes or detents 42 to accept the plunger mechanism 24 and the retention pins 38 and a logic module 14 as seen in FIGS. 6 and 7 in a first position and in a second position in FIG. 8 in which the user interface module 16 is rotated 90°.

Figure 9:
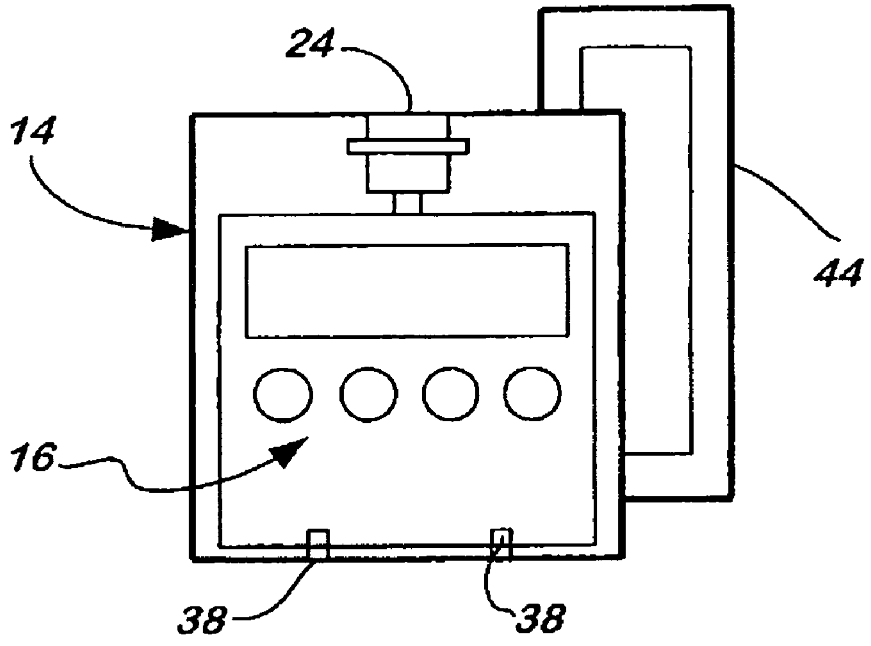
FIG. 9 is a front elevational view of the user interface module nested on the logic module and with a cable and connectors.

FIG. 9 is a front view of the user interface module 16 nested on the logic module 14 and connected by a cable 44.

Figure 10:
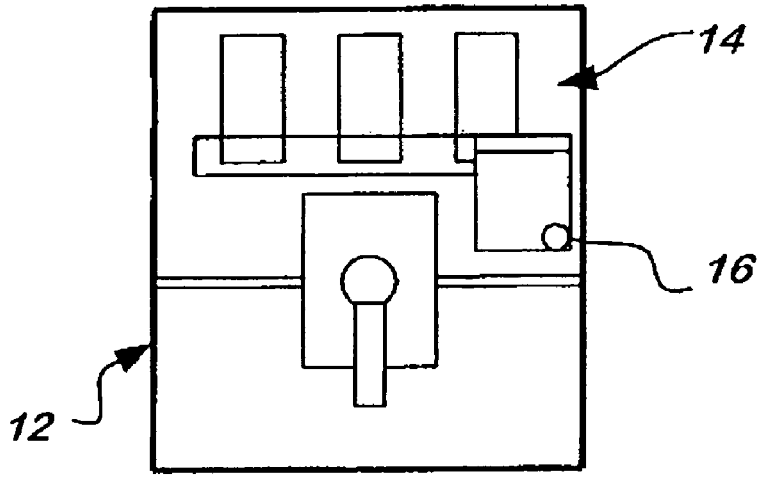
FIG. 10 is a front elevational view of the logic module and user interface module both mounted on the circuit breaker.

FIG. 10 is a low voltage air circuit breaker 12 with a logic module 14 mounted thereon on the breaker and showing the user interface module 16 nested thereon.

Figure 11:
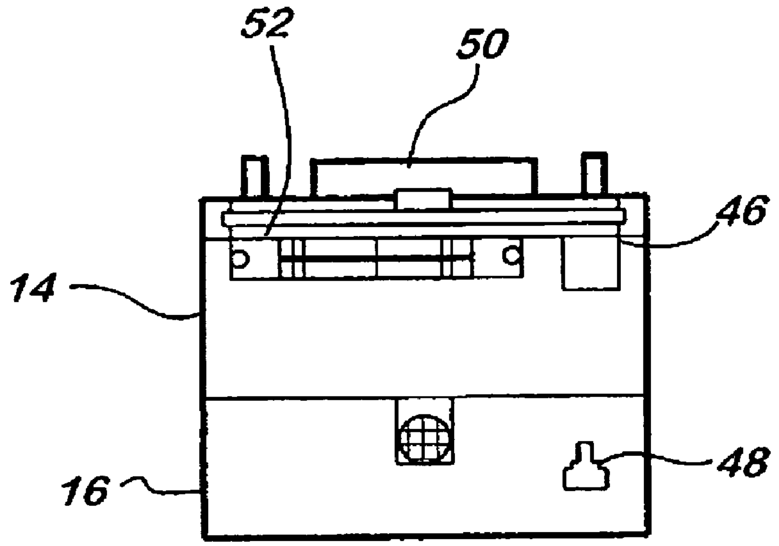
FIG. 11 shows the logic and user interface modules after coupling.

FIG. 11 is a top view showing the user interface module 16 nested in assembly with the logic module 14 and the various connectors 40, 42, 44, 46.

Figure 12:
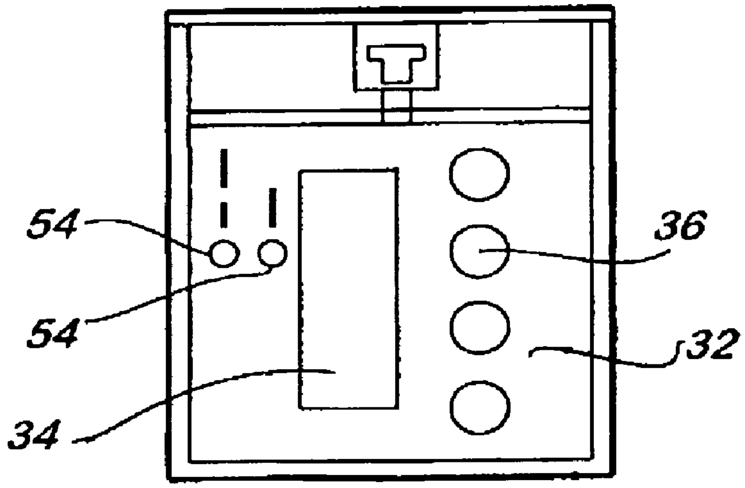
FIG. 12 illustrates the face of the assembly in FIG. 20.

FIG. 12 is a front elevational view of the nested assembly of the modules 14, 16. The face panel 32 includes an LCD display 34, operating buttons 36, and red and green indicator LED's 54.

Figure 13:
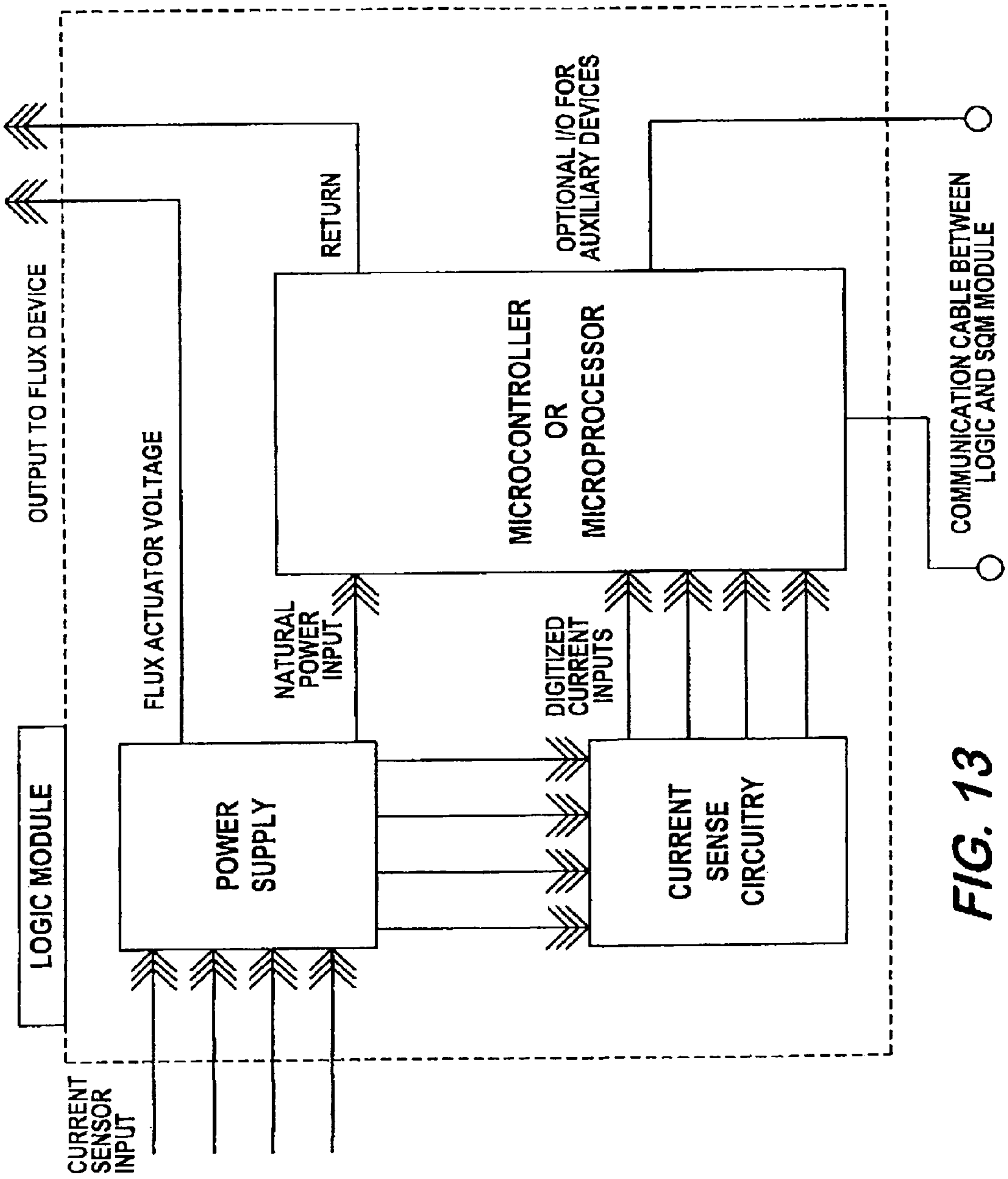
FIG. 13 is block diagram of the logic module.
Figure 14:
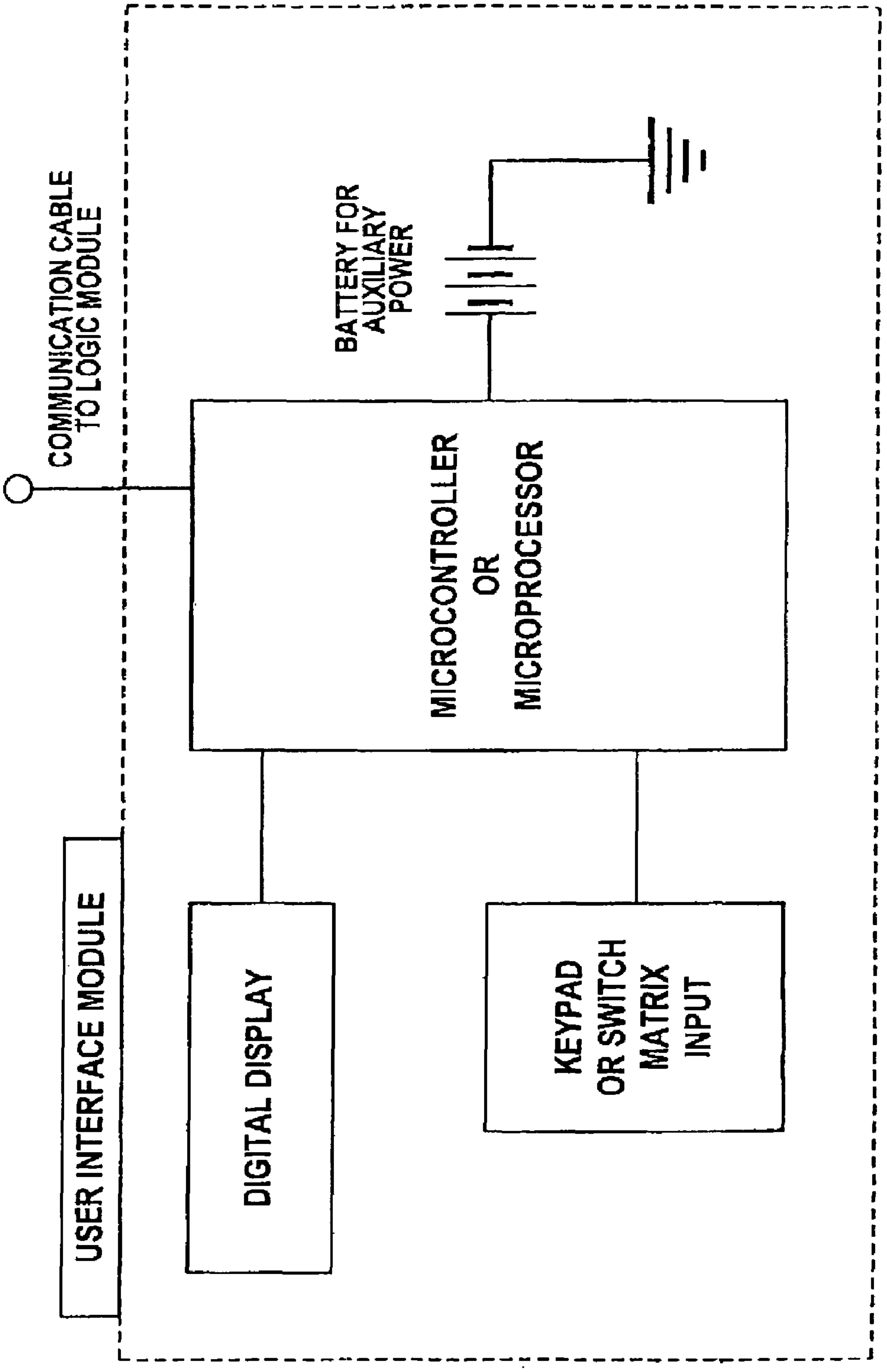
FIG. 14 is a block diagram of the user interface module.

FIG. 13 is a block diagram of the logic module 14, and FIG. 14 is a block diagram of the user interface module 16.

Figure 15:
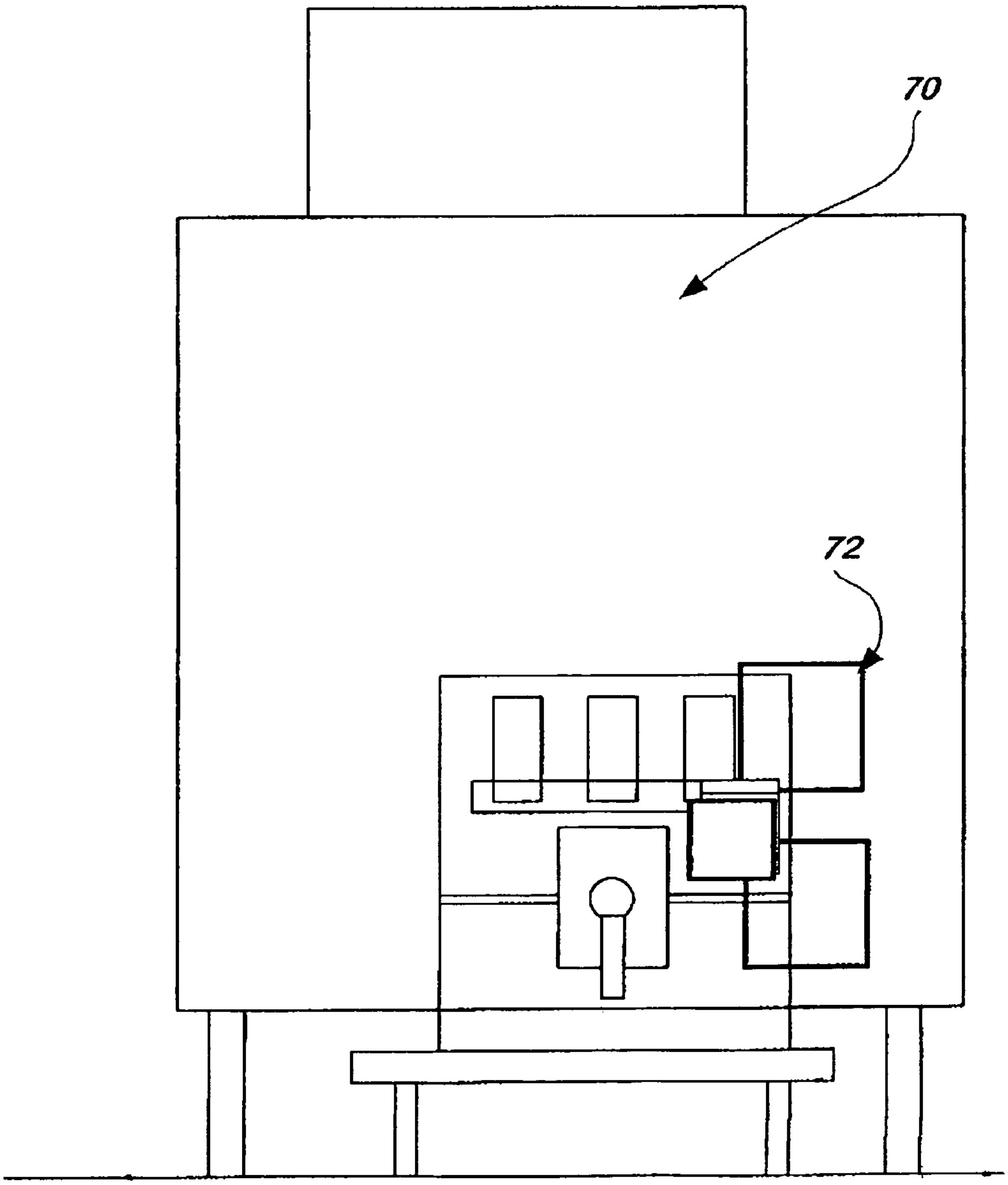
FIG. 15 is a diagrammatic view showing the breaker racked out of the cubicle for primary injection testing.

FIG. 15 is a schematic illustration of the breaker removed from the cubicle for set up and/or maintenance eliminated for set up. The breaker 12 is shown on a primary injection high current test set 70, and high current stabs 72. The nested logic and user interface modules 14, 16 are mounted on the breaker 12.

Figure 16:
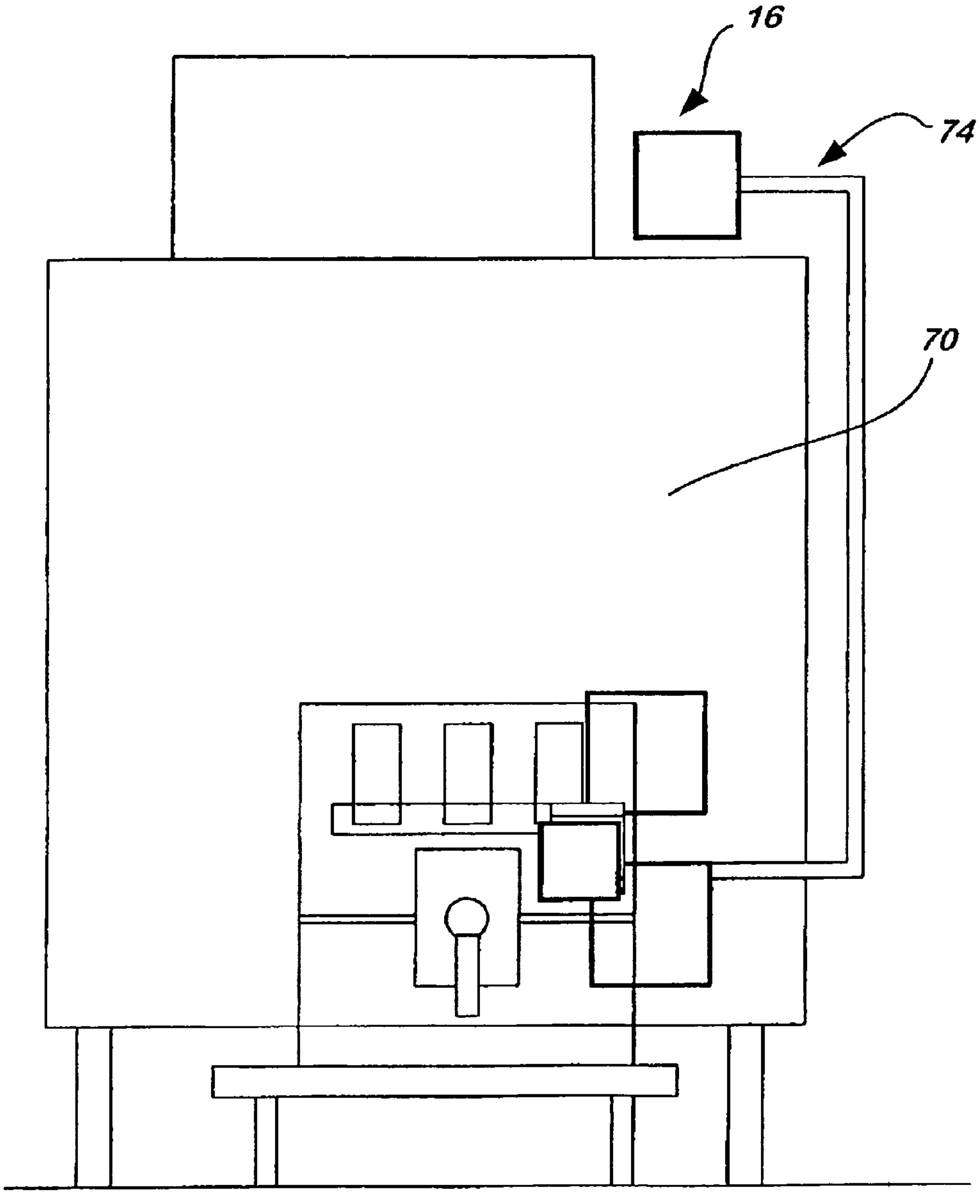
FIG. 16 is a similar view but with the user interface module interconnected by cable to the logic module.

In FIG. 16, the user interface module 16 has been removed from the logic module 14 and is connected thereto by a cable 74 so that the technician can conduct the various operations on the logic interface module while standing rather than crouched.

The two modules which form the programmable assembly of a solid state tripping system, for low voltage circuit breakers are denoted the logic module, and for the setup, querying, battery and monitoring, the user interface module.

The logic module is designed to be bolted to a mounting bracket individually designed to specifically match the physical characteristics of and bolt to each type and manufacturer of low voltage circuit breakers. The logic module and the bracket are of a size to fit every low voltage circuit breaker.

Desirably, the logic module is housed in an extruded anodized aluminum assembly with bolted anodized aluminum end plates although it can also be fabricated from plastic or other suitable metals. The bracket in turn is mounted on the breaker. The logic module housing is designed to have three cutout ports to allow for access to connectors integral to the logic module.

The first connector is utilized for electrical connection to the user interface module or for direct connection to a user interface cubicle mounting assembly or docking station on the door outer face. The interface module 16 is designed to physically fit the docking station and be operable on the front door of each cubicle that houses a low voltage air circuit breaker.

A hole is drilled through the front door of the cubicle to allow for passage of a category 5 or flat telecommunications cable and RJ45 connector from the logic module to a permanently housed connector.

The mounting assembly on the exterior of the cubicle is designed to physically and electrically accept the user interface module, which, because of the interface module's portable design, can be removed from a location nested on the logic module and secured in the door mounting assembly.

Preferably, the user interface module cubicle mounting assembly is designed to permanently house a RJ45 connector which can be accessed by operating personnel from the outside of the front door of the cubicle, and the connector is utilized to connect to the integral connector of the user interface module by a Category 5 cable. This connector is easily accessed by the operating personnel who wish to setup, query and/or monitor the low voltage circuit breaker located behind the front door. The mounting assembly is designed with an integral channel to house and physically protect the Category 5 cable that connects the mounting assembly connector to the user interface module connector.

The logic module's second connector is utilized for communication devices external to the circuit breaker and for external devices which need to access the logic module's auxiliary components.

The logic module's third connector is utilized for electrical connection to the current sensors mounted in the low voltage circuit breaker and for connection to the flux trip device of the low voltage circuit breaker.

The optimum logic module is designed to have a printed circuit board that contains electronic components which:

a. receive information regarding amperage flow from the current sensors of the circuit breaker,
b. convert the current sensor signals to digital information,
c. process the digital information based on setting information electrically received from the user interface module,
d. process information to account for the rms value of the amperage signals sent from the current sensors,
e. process digital information based on published time/current tripping characteristic curves,
f. process voltage information from external potential transformers and/or directly from the in-line copper components of the circuit breaker,
g. process metering information based on the signals from the current sensors and the voltage signals from the potential transformers or the in-line copper of the circuit breaker,
h. provide dry contacts for external use,
i. deal with information related to communication to external devices
j. provide tripping signals to the circuit breaker flux trip device.

The user interface module is designed to be of such a size as to:

a. attach to and nest on the logic module,
b. to physically fit on every low voltage circuit breaker
c. and to externally mount on the outside of the door to every low voltage circuit breaker cubicle
d. and to be physically removed from both the low voltage circuit breaker and from the front door of the circuit breaker cubicle and utilized in a portable manner.

The user interface module housing or docking station is made with two round holes to receive the spring loaded plunger on the logic module and two sets of holes to receive the retention pins on the logic module.

The user interface module housing is designed to have one cutout port to allow access to its integral RJ45 connector.

The user interface module contains printed circuit boards that contain electronic components that send information to and receive information from the logic module regarding setup characteristics integral to the low voltage air circuit breaker's tripping system. These setup characteristics deal with at least:

a. amperage pickup points,
b. inverse current/time tripping characteristics from published curves,
c. short time pickup points and time current curves,
d. instantaneous pickup points,
e. 12t information,
f. ground fault information.

The user interface module contains printed circuit boards that contain electronic components which query the logic module regarding:

a. breaker trip settings,
b. breaker trip history and information pertinent to the breaker, logic unit or circuit being protected including but not limited to:
   1. the logic module serial number,
   2. breaker manufacturer,
   3. frame size,
   4. interrupting capacity,
   5. breaker serial number,
   6. building and substation name,
   7. cubicle designation, and
   8. equipment name and location The user interface module is designed to contain printed circuit boards that contain electronic components that receive metering signals from the logic module regarding:

a. current flow,
b. system voltage,
c. system kva,
d. system kw,
e. system power factor,
f. system kvar,
g. impedence angle,
h. +/− sign of the impedance angle.

The user interface module also has printed circuit boards that contain electronic components that receive relaying signals from the logic module regarding:

a. circuit breaker status with regard to existing over current conditions,
b. amperage at which the breaker tripped,
c. the breaker phase that experienced the over current condition,
d. the type of over current that was experienced,
e. possible blown fuse indication,
f. tabulation of each type of trip,
g. state of the TOC.

The capability of performing all of the above listed functions has been designed into the unit. Some of the above listed items are not critical for the unit to perform its core function and some functions may not be implemented to reduce costs. The user interface module also contains printed circuit boards that communicate with the logic module regarding the setup of external communication functions.

The user interface module houses a battery clip assembly for housing an integral lithium battery. The user interface module houses a printed circuit board connected to the battery clip assembly with circuits designed to provide auxiliary voltage signals to power the display and to query the logic module when the power that might be derived from current sensors does not exist.

The user interface module has four setup buttons on the face of the module which allow operating personnel, by pressing the buttons, to enter, query and monitor the menus of information which relate to the operation of the solid state tripping system.

The user interface module also has an LCD display on the face of the module to provide visual feedback to the operating personnel regarding the setup, querying and monitoring functions of the solid state tripping system.

Desirably, the user interface module has on its face red and green lights. The red light, when lit, provides information regarding the fact that the circuit breaker is experiencing a current flow greater than the values selected by the operating personnel. The green light, when lit, indicates that there is current flowing, through the secondary of the current sensor, greater than a value approximately equal to 12 milliamps.

The user interface module has a face plate containing information pertinent to the device and having cutouts for the display and the lights and containing four tactile button covers which are not labeled. The button covers, when pressed, make contact with the four buttons mounted in the user interface module allowing for the performance of the functions detailed on the LCD screen directly above the buttons.

Thus, it can be seen from the foregoing detailed specification and attached drawings that the improved switchgear assembly of the present invention enables the operator to perform routine monitoring, querying and controlling of the circuit breaker while safely located outside of the cubicle. The user interface module may be moved from one cubicle to another quickly and easily, and the cost of the installation is reduced by eliminating redundancy and by separation of the logic and operator interface functions into discrete modules.

Having thus described the invention, what is claimed is:

1. A multiplicity of switchgear installations, each comprising:

(a) a cubicle having a door to provide access thereinto and having a docking station mounted on the exterior thereof;

(b) a low voltage circuit breaker mounted in each of said cubicles and accessible through said door;

(c) a logic module coupled to said circuit breaker and operatively connected to various components of said breaker to enable adjustment of its operation and to report on its operation;

(d) at least one cable extending from said logic module to said docking station; and (e) a portable user interface module releasably mounted in the docking station of one of said cubicles and operatively connected to said logic module by the cable when so mounted, said interface module displaying information concerning the operation of the breaker to which connected and providing an interface for the user to manually interact with said logic module and thereby with said breaker, said interface module including a battery to provide the power necessary for operation of the logic module for reporting the operation of the breaker and for making adjustments thereto.

2. The switchgear installation in accordance with claim 1 wherein said docking station is mounted on said door and provides a mounting into which said portable user interface module may be readily inserted or removed therefrom for mounting in the docking station of another switchgear installation.

3. The switchgear installation in accordance with claim 1 wherein said portable user interface module from said docking station is nested on said logic module and is readily removable therefrom.

4. The switchgear installation in accordance with claim 1 wherein said portable user interface module enables setting up, monitoring, querying functions for said breaker.

5. The switchgear installation in accordance with claim 1 wherein said docking station includes a connector to which said user interface module is coupled upon mounting therein.

6. The switchgear installation in accordance with claim 1 wherein there are multiple cubicles with breakers, docking stations and logic modules, said user interface module being releasably mountable in the docking stations of each of said cubicles to interface with the logic module and breaker in each of the cubicles.

* * * * *